Jan. 15, 1963    F. REICHENEDER ETAL    3,073,872
PRODUCTION OF BICYCLO-[2,2,1]-HEPTADIENE-(2,5)
Filed Aug. 10, 1960
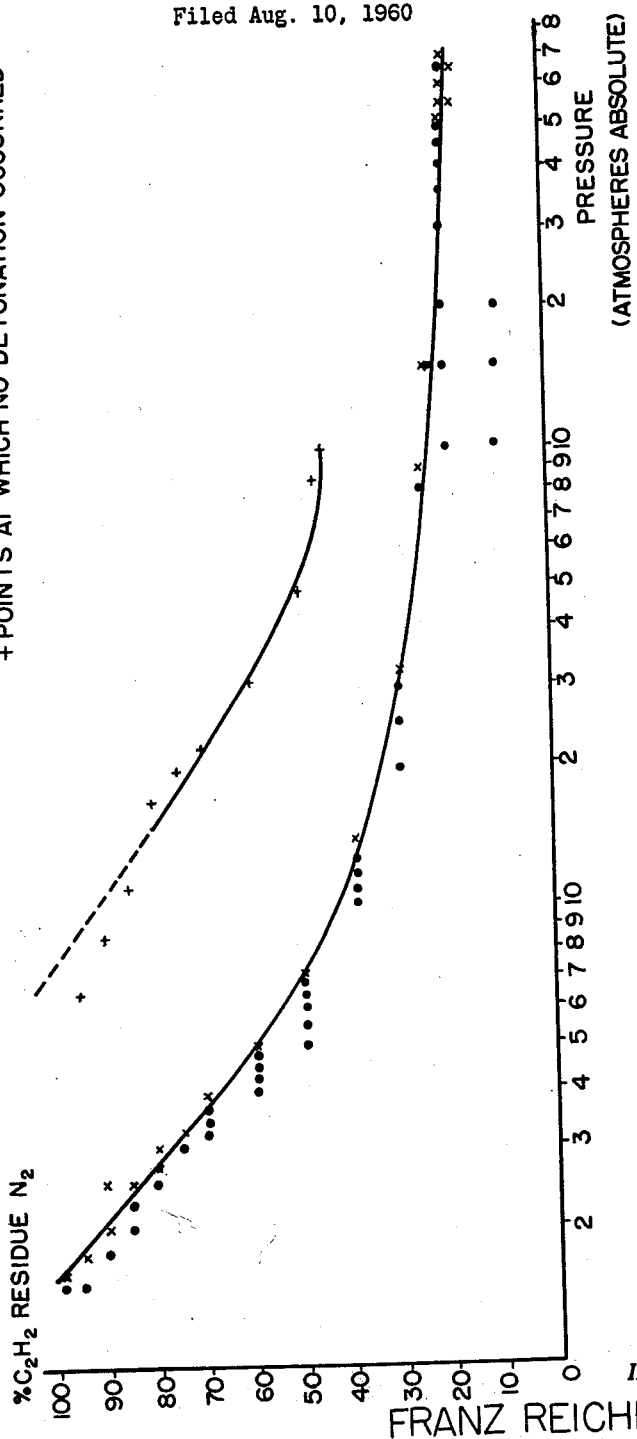
INVENTORS:
FRANZ REICHENEDER
KARL DURY
BY Mazzee, Johnston, Cook & Root
ATT'YS 3,073,872
PRODUCTION OF BICYCLO-[2,2,1]-HEPTADIENE-(2,5)
Franz Reicheneder and Karl Dury, Ludwigshafen (Rhine), Germany, assignors to Badische Anilin- & Soda-Fabrik Aktiengesellschaft, Ludwigshafen (Rhine), Germany
Filed Aug. 10, 1960, Ser. No. 48,732
Claims priority, application Germany Aug. 13, 1959
3 Claims. (Cl. 260—666)

This invention relates to a process for the production of bicycloheptadiene starting from an initial material not hitherto used for the purpose.

It is known that bicyclo-[2,2,1]-heptadiene-(2,5) is obtained by allowing acetylene to act on cyclopentadiene at temperatures between about 150° and 400° C. and pressures of about 10 to 23 atmospheres. This method has considerable disadvantages in so far as the reaction conditions lie within the explosion or detonation range of acetylene and the process can, therefore, only be carried out under extensive safety measures. A further disadvantage lies in the fact that the yields of bicycloheptadiene are unsatisfactory and the reaction mixture obtained contains, besides the desired product, numerous by products and high-polymer resin-like compounds. It is especially disadvantageous that, when the said known method is applied, the unreacted cyclopentadiene is largely converted into undesirable byproducts, especially into dicyclopentadiene which has to be split to yield monomeric cyclopentadiene in a separate process stage before it can be returned to the process.

It is an object of the present invention to provide a process for the production of bicycloheptadiene in which the dicyclopentadiene forming by self-addition of cyclopentadiene can be directly reacted, under suitable conditions and without having to be split in a separate process stage, with acetylene to form the desired and extremely valuable bicycloheptadiene. A further object is to find conditions under which acetylene can be reacted in a completely safe manner with dicyclopentadiene to form bicycloheptadiene. Yet another object is to use for the direct production of bicycloheptadiene an initial material which hitherto has not been considered suitable for direct use.

We have found that the above-mentioned objects can be achieved and bicyclo-[2,2,1]-heptadiene-(2,5) can be obtained in good yields and in an entirely safe manner by reacting dicyclopentadiene, advantageously in the presence of an inert organic solvent, with a mixture of acetylene and an inert gas whose acetylene content lies between 10 and 25% by volume at temperatures above 150° C., especially at 155° to 250° C., and at a total pressure of between 75 and about 400 atmospheres, with the proviso that the total pressure within the said range is lower than the decomposition limiting pressure of the gas mixture and on the other hand is only so high that the acetylene concentration in the liquid phase at the temperature used remains below the ignition limiting concentration. By the term "liquid phase" we understand liquid dicyclopentadiene and any liquid organic solvent that may be present as a diluent.

Suitable acetylene/inert gas mixtures are above all mixtures of acetylene and nitrogen. However, noble gases, such as helium, neon and argon, or methane or mixtures of the said inert gases may also be used in admixture with acetylene. The acetylene content in the acetylene/inert gas mixtures should not be lower than 10% by volume with reference to the total volume of acetylene and inert gas. In general, an acetylene concentration in the gas mixture of between about 10 and 25% by volume, advantageously of between about 14 and 20% by volume, is used.

The decomposition limiting pressure of mixtures of acetylene and inert gases, such as nitrogen or noble gases, is known to depend on the composition of the gas mixture. The accompanying drawing shows the curve of the known course of the decomposition pressure for a mixture of acetylene and nitrogen in dependence on its acetylene content. In the diagram, the acetylene content of the gas mixture is plotted in percent by volume on the ordinate and the total pressure in atmospheres absolute in logarithmic scale on the abscissa.

For mixtures of acetylene and noble gases, the decomposition limiting pressures in dependence on the composition of the gas mixture and the total pressure can readily be ascertained in known manner, for example by igniting a gas mixture introduced into an alloy steel pressure tube by means of a platinum wire heated to fusion (cf. W. Reppe, "Chemie und Technik der Acetylen-Druckreaktion," Verlag Chemie, Weinheim, 1951, pages 1 to 19). For each acetylene/inert gas mixture with an acetylene content of between 10 and 25% by volume used, it is possible to prepare a diagram (such as the accompanying diagram for a mixture of acetylene and nitrogen) from which can be read the decomposition limiting pressure of the acetylene-containing gas mixture which must not be exceeded and which constitutes an essential and critical condition for the total pressure to be chosen from between 75 and 400 atmospheres for carrying out the reaction. On the other hand, it is also possible to infer from the decomposition limiting pressure diagram each critical acetylene concentration of the acetylene/inert gas mixture which must not be exceeded and which is co-ordinated with a specific critical decomposition limiting pressure. As may be seen from the accompanying diagram, it is possible to work with gas mixtures containing 20% by volume of acetylene at total pressures up to 200 atmospheres, and with gas mixtures containing for example 23% by volume of acetylene at total pressures up to about 190 atmospheres because, as shown below, even at these total pressures the concentration of acetylene in the liquid phase does not exceed the ignition limiting concentration.

The ignition limiting concentration of acetylene in the liquid phase is not exceeded if the acetylene concentration in the liquid phase at the partial pressure exerted by the acetylene does not exceed 130 cc. of acetylene (calculated to normal conditions) per cc. of liquid (N cc. of acetylene per cc. of liquid). The acetylene concentration in the liquid phase of the reaction solution is determined mainly by the proportion of the acetylene pressure to the total pressure (acetylene partial pressure of the acetylene/inert gas mixture) and the working temperature. In determining the acetylene concentration in the liquid phase, it may be assumed that the reaction solution as used for the reaction, i.e., with or without the addition of an inert organic solvent to the dicyclopentadiene, dissolves a maximum of about 3 cc. of acetylene per cc. of liquid per atmosphere of acetylene partial pressure of the acetylene/inert gas mixture at temperatures of 60° to 90° C. The solubility of acetylene in the liquid phase fluctuates slightly according to the nature of the solvent, but the stated maximum value of 3 cc. of acetylene per cc. of liquid per atmosphere of acetylene partial pressure of the acetylene/inert gas mixture is generally not reached because the solubility of acetylene in the liquid decreases with increasing temperature. It has been found that, since the working temperature for the process according to this invention is at least 150° C. and especially 155° to 250° C., a sufficient degree of safety is provided by the said maximum value for the solubility of acetylene per atmosphere of partial pressure and per cc. of dicyclopentadiene and all solutions prepared from dicyclopentadiene and inert organic solvents, so that it is not necessary to determine the solubility of acetylene for every solution intended to be used. For carrying out the reaction, it is preferable to use a total pressure which is lower than the decomposition limiting pressure in the gas phase and which for the solubility of acetylene in the liquid phase gives a value of about 90 to 120 cc. of acetylene per cc. of liquid, based on a solubility of 3 cc. per cc. of liquid per atmosphere of acetylene partial pressure. When an acetylene/nitrogen mixture containing 20% by volume of acetylene is used, the acetylene partial pressure is 40 atmospheres at a total pressure of 200 atmospheres. As may be seen from the diagram of the decomposition limiting pressures for acetylene/nitrogen mixtures, the total pressure of 200 atmospheres is lower than the decomposition limiting pressure for an acetylene/nitrogen mixture containing 20% by volume of acetylene. Since an acetylene partial pressure of 40 atmospheres in the liquid phase gives a concentration of 120 cc. per cc. of liquid based on a solubility of 3 cc. per cc. per atmosphere of acetylene partial pressure, and the value of 120 cc. of acetylene per cc. of liquid is below the said ignition limiting concentration of 130 cc. of acetylene per cc. of liquid, it is thus possible to carry out the reaction according to the present invention with absolute safety with an acetylene/nitrogen mixture containing 20% by volume of acetylene at a total pressure of 200 atmospheres.

As already stated, inert organic solvents may be present during the reaction. Their coemployment is even advantageous. Suitable solvents include aromatic hydrocarbons of the benzene series which may also be substituted by 1 to 3 alkyl groups, especially those with 1 to 3 carbon atoms. Examples are: benzene, toluene, xylene, ethylbenzene, isopropylbenzene and di-isopropylbenzene. Other hydrocarbons that may be used advantageously include hydroaromatic hydrocarbons, such as tetrahydronaphthalene, decahydronaphthalene, cycloaliphatic hydrocarbons with 5 to 8 ring carbon atoms which may be unsubstituted or substituted by alkyl groups with up to 3 carbon atoms, such as cyclopentane, cyclohexane, cyclooctane, methylcyclohexane, as well as paraffin hydrocarbons with boiling points between 70° and 280° C. i.e., aliphatic hydrocarbons which contain about 6 to 16 carbon atoms. Further suitable solvents include simple aliphatic ketones with 3 to 8 carbon atoms, such as acetone and methyl ethyl ketone, cycloaliphatic ketones with 5 to 8 carbon atoms, such as cyclopentanone, cyclohexanone and cyclo-octanone, as well as neutral esters of monobasic and dibasic aliphatic carboxylic acids which contain 2 to 4 carbon atoms and of benzene mono- or dicarboxylic acids with an alcohol component which contains 1 to 8 carbon atoms. Typical representatives of the esters include ethyl acetate, butyl acetate, methyl butyrate, benzoic acid methyl ester and benzoic acid propyl ester, dimethyl phthalate, dioctyl phthalate and dimethyl adipate. Other suitable solvents include cyclic ethers, especially those with 5 or 6 ring members, aromatic- aliphatic ethers and dialkyl ethers. Suitable ethers include dioxane, tetrahydrofurane, anisole and di-isopropyl ether. Further suitable solvents include unsubstituted or dialkyl-substituted, advantageously dimethyl- to dibutyl-substituted, carboxylic acid amides of saturated carboxylic acids containing 1 to 6 carbon atoms, which may also be united to a ring, especially formamide, dimethylformamide, acetamide, dimethyl acetamide, butyramide, N-methylbutyramide, N,N-dibutylbutyramide, hexanic acid amide, N-methylhexanic acid amide, N-methylpyrrolidone-(2) and N-methylpiperidone-(2). Finally, lactones with 4 to 6 carbon atoms, such as butyrolactone, valerolactone and ethylbutyrolactone, may also be specified as solvents.

When solvents are employed, it is preferable to use dicyclopentadiene concentrations of about 20 to 80% by weight, especially 40 to 60% by weight solutions. Solvents of the said kind whose boiling points lie between about 100° and 280° C. are especially preferred because working up can then be carried out in an especially advantageous and simple manner with considerable saving of energy.

It has also proved to be convenient to add to the dicyclopentadiene or the solutions thereof used as initial mixtures, prior to the reaction, small amounts, e.g., about 0.01 to 1% by weight with reference to dicyclopentadiene, of polymerization inhibitors, such as hydroquinone, pyrogallol, butylpyrocatechol, gallic acid alkyl esters in which only the carboxyl group is esterified with lower alkanols with 1 to 8 carbon atoms, phenothiazine or methylene blue.

The process may be carried out discontinuously, or advantageously continuously, in countercurrent or cocurrent. When working continuously, it is possible to work either by the sump process or by the trickling process. The reaction may always be carried out by placing dicyclopentadiene or a solution thereof, possibly preheated, in a reaction vessel heated to the reaction temperature and then forcing in the mixture of acetylene and inert gas up to the permissible total pressure as determined in the manner described above. The process may, however, also be carried out by placing the dicyclopentadiene or a solution thereof in a pressure-proof vessel, adding an oxidation inhibitor if desired, heating the vessel to the desired reaction temperature and forcing in a mixture of acetylene and inert gas up to a pressure which does not exceed the determined permissible total pressure. Furthermore, the process may be carried out by treating the dicyclopentadiene, a solution thereof or the solvent alone with acetylene at room temperature at such a pressure that the ignition limiting concentration, i.e., 130 cc. (at normal conditions) of acetylene in 1 cc. of liquid, is not reached, for example by forcing in acetylene or a mixture of acetylene and an inert gas, such as nitrogen. The mixture is then placed in the reaction vessel and heated to the reaction temperature. This procedure is, however, less advantageous because during pre-saturation it is necessary to observe the safety regulations usual for working with acetylene under pressure, but the part of the apparatus required for pre-saturation is only a small portion of the whole apparatus and it is only for this small portion that safety precautions are necessary.

The fact that, under the conditions according to this invention, dicyclopentadiene reacts directly wtih acetylene to form bicycloheptadiene was unexpected in so far as splitting of dicyclopentadiene to yield monomeric cyclopentadiene at temperatures of about 150° to 250° C. and even at pressures of 75 to 200 atmospheres of an inert gas, for example nitrogen, cannot be detected.

The bicycloheptadiene obtained according to this invention may be used for all known purposes, for example for the production of pesticides.

The following examples will further illustrate this invention, but the invention is not restricted to these examples.

*Example 1*

100 cc. per hour of a solution of equal parts by volume of dicyclopentadiene and tetrahydronaphthalene are introduced into the top of a 1 liter trickling vessel with a nominal pressure of 200 atmospheres gage. At the same time, a gas mixture of 20% by volume of acetylene and 80% by volume of nitrogen is led in from below at 200 atmospheres gage total pressure. The temperature of the vessel is adjusted to about 200° C. The acetylene content of the waste gas is kept at 14 to 17% by volume by regulating the amount of fresh gas supplied to the vessel. The reaction product withdrawn at the bottom of the vessel consists of a 31% by weight solution of bicyclo-[2,2,1]-heptadiene-(2,5) and also contains unreacted dicyclopentadiene. The reaction mixture is worked up by fractional distillation; a water jet vacuum and a bath temperature of up to 50° C. are used, and the bicyclo-[2,2,1]-heptadiene-(2,5) collects in a receiver cooled with a mixture of carbon dioxide and methanol. It is rectified at normal pressure and then has a boiling point, at 760 mm. Hg, of 89° C. The conversion is 46%, and the yield of pure product is more than 95% of the theory.

If, instead of the dicyclopentadiene/tetrahydronaphthalene solution, 110 cc. per hour of a solution of equal parts by volume of dicyclopentadiene and isopropylbenzene are introduced into the vessel and the procedure is otherwise carried out in the same manner and under the same conditions, the reaction product (102 grams per hour) contains 25% by weight of bicyclo-[2,2,1]-heptadiene-(2,5) according to the infrared spectrum. The conversion of dicyclopentadiene is 37%, and the yield of bicyclo-[2,2,1]-heptadiene-(2,5) is 95%.

*Example 2*

50 cc. per hour of a mixture of equal parts by volume of dicyclopentadiene and benzene are pumped into the apparatus described in Example 1 at a vessel temperature of 240° C. At the same time, an acetylene/nitrogen gas mixture containing 20% by volume of acetylene is forced in at a total pressure of 200 atmospheres gage. The reaction mixture obtained (45 grams per hour) consists of a solution containing, on an average, 22% by weight of bicyclo-[2,2,1]-heptadiene-(2,5).

*Example 3*

100 cc. per hour of dicyclopentadiene are pumped into the top of an empty 1 liter high-pressure sump vessel at an internal vessel temperature of 190° C. At the same time, an acetylene/nitrogen gas mixture containing 20% by volume of acetylene is forced into the vessel from above at a total pressure of 200 atmospheres absolute. The waste gas is withdrawn with the liquid reaction mixture at the lower end of the vessel. The acetylene content of the waste gas is adjusted to 12 to 14% by volume by forcing in fresh gas. The liquid product (92 grams per hour) contains 25% by weight of bicyclo-[2,2,1]-heptadiene-(2,5). The remainder is unreacted dicyclopentadiene.

*Example 4*

The procedure described in Example 3 is followed with the difference that the supply consisting of dicyclopentadiene, prior to introduction into the vessel, is pre-saturated at 20° C. with acetylene of 10 atmospheres gage in a high-pressure tube filled with filler bodies. The reaction mixture withdrawn from the sump vessel (92 grams per hour) contains 17% by weight of bicyclo-[2,2,1]-heptadiene-(2,5) according to infra-red analysis. By fractional distillation at a reduced pressure of 20 mm. Hg, 0.36 kilogram of bicyclo-[2,2,1]-heptadiene-(2,5) is obtained from a total of 2.114 kilograms of reaction mixture collected after 24 hours of operation.

*Example 5*

A solution consisting of equal parts by volume of dicyclopentadiene and tetrahydrofurane is saturated with acetylene at room temperature in a high-pressure tube filled with filler bodies by keeping the saturator at a pressure of 15 atmospheres gage by forcing in pure acetylene.

The dicyclopentadiene/tetrahydrofurane solution saturated with acetylene is led from the saturator into the top of a 3 liter trickling vessel with a nominal pressure of 200 atmospheres gage in amounts of 150 cc. per hour. The vessel has an internal temperature of 200° to 205° C. and is kept at a total pressure of 200 atmospheres gage by forcing in a gas mixture containing 20% by volume of acetylene and 80% by volume of nitrogen. The acetylene content of the waste gas is adjusted to between about 12 and 15% by volume.

The reaction mixture is withdrawn continuously at the lower end of the vessel. According to infra-red analysis, it contains 30% by weight of bicyclo-[2,2,1]-heptadiene-(2,5). The amount of 3.072 kilograms of reaction mixture collected in 24 hours of operation is worked up together by fractional distillation, the bicycloheptadiene being distilled off in a water jet vacuum and at a bath temperature of 50° C. From the said amount of reaction mixture, 0.915 kilogram of bicycloheptadiene is obtained by fractional distillation.

The residue which remains after the bicycloheptadiene has been distilled off, may, after the addition of fresh dicyclopentadiene (up to 50%), be directly re-saturated with acetylene and led into the reaction vessel in the manner described above. If fresh dicyclopentadiene is not added, the residual dicyclopentadiene is reacted and disappears completely when being passed through a second time.

*Example 6*

100 cc. per hour of a solution of equal parts by volume of dicyclopentadiene and cyclohexane are pumped into the top of a 1 liter trickling vessel with a nominal pressure of 200 atmospheres gage. At the same time, a gas mixture of 20% by volume of acetylene and 80% by volume of nitrogen is led in at 200 atmospheres gage total pressure. The temperature of the vessel is kept at 210° C. By regulating the amount of fresh gas supplied to the vessel, the acetylene content of the waste gas is adjusted to 14 to 16% by volume. At the bottom of the vessel, 925 grams of a reaction product in the form of a 10% by weight solution of bicyclo-[2,2,1]-heptadiene-(2,5) in unreacted dicyclopentadiene and cyclohexane are obtained within 12 hours.

*Example 7*

By following the procedure described in Example 6, with the difference that 100 cc. per hour of a mixture of equal parts by volume of dicyclopentadiene and dimethylcyclohexane which in addition contains 1% of dissolved hydroquinone are introduced into the vessel, 960 grams of a reaction mixture consisting of a solution containing 11% of bicyclo-[2,2,1]-heptadiene-(2,5) are obtained at the bottom of the vessel within 12 hours.

*Example 8*

100 cc. per hour of a solution of equal parts by volume of dicyclopentadiene and cyclo-octane are pumped into a 1 liter high-pressure sump vessel at an internal vessel temperature of 210° C. The feed solution is stabilized with 0.1% of hydroquinone. At the same time, an acetylene/nitrogen mixture containing 20% by volume of acetylene is forced into the top of the vessel at a total pressure of 100 atmospheres absolute. The waste gas is withdrawn with the liquid reaction mixture at the bottom of the vessel. The acetylene content of the waste gas is adjusted to 10 to 12% by volume by forcing in fresh gas. Within 12 hours, 832 grams of a liquid reaction product containing 10% of bicyclo-[2,2,1]-heptadiene-(2,5) are obtained.

*Example 9*

100 cc. per hour of a mixture of equal parts by volume of dicyclopentadiene and a gasoline fraction boiling at 110° to 250° C., which in addition contains 0.01% of dissolved hydroquinone, are pumped into the apparatus described in Example 6 at an internal vessel temperature of 200° C. At the same time, an acetylene-nitrogen gas mixture containing 20% by volume of acetylene is forced in at a total pressure of 200 atmospheres gage. The reaction mixture obtained (650 grams within 12 hours) consists of a solution containing, on an average, 11% by weight of bicyclo-[2,2,1]-heptadiene-(2,5).

*Example 10*

The procedure described in Example 9 is followed with the difference that a feed solution consisting of equal parts by volume of dicyclopentadiene and methylcyclohexane, which in addition contains 2% of dissolved hydroquinone, is allowed to react with an acetylene/nitrogen gas mixture containing 20% by volume of acetylene at an internal vessel temperature of 165° C. and at a total pressure of 200 atmospheres gage. 860 grams of a reaction mixture containing 3% of bicycloheptadiene are obtained within 12 hours.

*Example 11*

By following the procedure described in Example 10, but pumping into the apparatus 100 cc. per hour of a solution of 30% of dicyclopentadiene and 70% of methylcyclohexane, which in addition contains 0.1% of dissolved phenothiazine, at an internal vessel temperature of 240° to 245° C., 540 grams of a reaction product containing 24% by weight of bicyclo-[2,2,1]-heptadiene-(2,5) are obtained within 12 hours.

*Example 12*

100 cc. per hour of a solution of equal parts by volume of dicyclopentadiene and anisole are pumped into the top of an empty 1 liter high-pressure sump vessel at an internal vessel temperature of 210° C. At the same time, an acetylene-nitrogen gas mixture containing 20% by volume of acetylene is forced into the vessel from above at a total pressure of 200 atmospheres absolute. The waste gas is withdrawn with the liquid reaction mixture (890 grams within 12 hours) at the bottom of the vessel. The acetylene content of the waste gas is adjusted to 10 to 12% by volume by forcing in fresh gas. The reaction mixture contains 4% of bicyclo-[2,2,1]-heptadiene-(2,5).

*Example 13*

By following the procedure described in Example 12, but introducing into the vessel 100 cc. per hour of a mixture of equal parts by volume of dicyclopentadiene and acetone, 835 grams of a reaction mixture containing 7% by weight of bicyclo-[2,2,1]-heptadiene-(2,5) are obtained within 12 hours.

*Example 14*

By replacing the acetone in Example 13 by cyclohexanone, 1070 grams of a reaction mixture containing 9% by weight of bicyclo-[2,2,1]-heptadiene-(2,5) are obtained within 12 hours.

*Example 15*

By following the procedure described in Example 6 and introducing into the high-pressure reaction vessel, at 220° C., 100 cc. per hour of a solution of equal parts by volume of dicyclopentadiene and butyl acetate which in addition contains 0.01% of dissolved pyrogallol, 810 grams of a solution containing 8% by weight of bicyclo-[2,2,1]-heptadiene-(2,5) are obtained within 12 hours.

*Example 16*

By following the procedure described in Example 15, with the difference that 150 cc. per hour of a solution of equal parts by volume of dicyclopentadiene and ethyl benzoate are pumped into the reaction vessel at 200° C., 1110 grams of a solution containing 9% by weight of bicyclo-[2,2,1]-heptadiene-(2,5) are obtained in 12 hours.

*Example 17*

100 cc. per hour of a solution of equal parts by volume of dimethyl adipate and dicyclopentadiene which in addition contains 0.01% of phenothiazine are pumped into the apparatus described in Example 6 at an internal temperature of 215° C. 780 grams of a reaction mixture containing 8% by weight of bicyclo-[2,2,1]-heptadiene-(2,5) are obtained within 12 hours.

*Example 18*

By following the procedure described in the previous example, but pumping into the reaction vessel 100 cc. per hour of a solution of equal parts by volume of dicyclopentadiene and dioctyl phthalate, 1020 grams of a reaction mixture containing 11% by weight of bicyclo-[2,2,1]-heptadiene-(2,5) are obtained within 12 hours.

*Example 19*

By replacing the dioctyl phthalate in the feed by butyrolactone and otherwise proceeding as described in Example 18, 1280 grams of a reaction mixture containing 14% by weight of bicyclo-[2,2,1]-heptadiene-(2,5) are obtained within 12 hours.

*Example 20*

100 cc. per hour of a solution of equal parts by volume of dicyclopentadiene and N-methylpyrrolidone with an addition of 0.1% of phenothiazine are pumped into the top of an empty 1 liter high-pressure sump vessel at an internal vessel temperature of 205° C. At the same time, an acetylene/nitrogen gas mixture containing 20% by volume of acetylene is forced into the vessel from above at a total pressure of 200 atmospheres absolute. At the lower end of the vessel, the waste gas is withdrawn with the liquid reaction mixture. The acetylene content of the waste gas is adjusted to 14 to 17% by forcing in fresh gas. 1005 grams of a reaction mixture containing 9% by weight of bicyclo-[2,2,1]-heptadiene-(2,5) are obtained within 12 hours.

*Example 21*

The procedure described in Example 20 is followed with the difference that 100 cc. per hour of a feed mixture of equal parts by volume of dimethylformamide and dicyclopentadiene, which in addition contains 0.01% of dissolved methylene blue, are pumped into the reaction vessel. 975 grams of an 11% by weight solution of bicyclo-[2,2,1]-heptadiene-(2,5) are obtained within 12 hours.

What we claim is:

1. A process for the production of bicyclo-[2,2,1]-heptadiene-(2,5) wherein dicyclopentadiene is reacted at a temperature of more than 150° C. up to 250° C. with acetylene in admixture with an inert gas, the acetylene content in the gas mixture being between 10 and 25% by volume, at a total pressure between 75 and 400 atmospheres, the total pressure however being within a range which on the one hand is below the decomposition limiting pressure of the gas mixture and on the other hand is only so high that the acetylene concentration in the liquid phase at the temperature used is below the ignition limiting concentration of 130 N cc. of acetylene per cc. of liquid.

2. A process as claimed in claim 1 wherein a polymerization inhibitor selected from the group consisting of hydroquinone, pyrogallol, butylpyrocatechol, a gallic acid ester, phenothiazine and methylene blue is co-employed for the reaction.

3. A process as claimed in claim 1 wherein the reaction is carried out in the presence of at least one inert organic solvent selected from the group consisting of mononuclear benzene hydrocarbons, hydrogenated naphthalene hydrocarbons, cycloaliphatic hydrocarbons with 5 to 8 ring carbon atoms, paraffin hydrocarbons with about 6 to 16 carbon atoms, aliphatic ketones with 3 to 8 carbon atoms, cycloaliphatic ketones with 5 to 8 ring carbon atoms, neutral esters of carboxylic acid with 2 to 4 carbon atoms and alcohols with 1 to 8 carbon atoms, neutral esters of benzene carboxylic acids with alcohols with up to 8 carbon atoms, carboxylic acid amides of carboxylic acids containing 1 to 6 carbon atoms, lactones with 4 to 6 carbon atoms and cyclic 5- and 6-membered ethers.

References Cited in the file of this patent

UNITED STATES PATENTS 2,414,651     Latchum _____ Jan. 21, 1947

FOREIGN PATENTS 154,903     Australia _____ Jan. 26, 1954